United States Patent [19]

Imazeki et al.

[11] 4,408,840

[45] Oct. 11, 1983

[54] LIQUID CRYSTAL COMPOSITIONS CONTAINING PLEOCHROIC ANTHRAQUINONE DYES, LIQUID CRYSTAL DEVICES CONTAINING THE COMPOSITIONS, AND THE DYES

[75] Inventors: Shuji Imazeki, Hitachi; Akio Mukoh, Mito; Mikio Sato, Hitachi, all of Japan

[73] Assignee: Hitachi, Ltd., Tokyo, Japan

[21] Appl. No.: 304,360

[22] Filed: Sep. 22, 1981

[30] Foreign Application Priority Data

Sep. 22, 1980 [JP] Japan ................................ 55-130689

[51] Int. Cl.³ .......................... G02F 1/13; C09K 3/34; C09B 1/514
[52] U.S. Cl. ................................ 350/349; 252/299.1; 260/376; 260/377
[58] Field of Search ............................ 260/376, 377; 252/299.1; 350/349

[56] References Cited

U.S. PATENT DOCUMENTS

| | | |
|---|---|---|
| 4,308,161 | 12/1981 | Aftergut et al. ................. 252/299.1 |
| 4,308,163 | 12/1981 | Aftergut et al. ................. 252/299.1 |
| 4,308,164 | 12/1981 | Aftergut et al. ................. 252/299.1 |

FOREIGN PATENT DOCUMENTS

| | | |
|---|---|---|
| 2104 | 5/1979 | European Pat. Off. ......... 252/299.1 |
| 26004 | 4/1981 | European Pat. Off. ......... 252/299.1 |
| 2920730 | 11/1979 | Fed. Rep. of Germany ... 252/299.1 |
| 3028593 | 2/1981 | Fed. Rep. of Germany ... 252/299.1 |
| 3036853 | 4/1981 | Fed. Rep. of Germany ... 252/299.1 |
| 55-127485 | 10/1980 | Japan ................................ 252/299.1 |
| 56-38376 | 4/1981 | Japan ................................ 252/299.1 |
| 56-112967 | 9/1981 | Japan ................................ 252/299.1 |

OTHER PUBLICATIONS

Cox, R. J., Mol. Cryst. Liq. Cryst., vol. 55, pp. 1–32, (1979).

*Primary Examiner*—Teddy S. Gron
*Attorney, Agent, or Firm*—Antonelli, Terry & Wands

[57] ABSTRACT

A liquid crystal composition contains a pleochroic dye which is an anthraquinone dye having the group —O—COO— in a substituent group. Such a dye shows a reasonable order parameter and good solubility as well as stability in the liquid crystal composition.

5 Claims, 6 Drawing Figures

LIQUID CRYSTAL COMPOSITIONS CONTAINING PLEOCHROIC ANTHRAQUINONE DYES, LIQUID CRYSTAL DEVICES CONTAINING THE COMPOSITIONS, AND THE DYES

BACKGROUND OF THE INVENTION

1. Field of the Invention

The present invention relates to a liquid crystal composition for an electrooptic element, wherein the liquid crystal composition contains a pleochroic anthraquinone dye, and to a liquid crystal device employing such a composition. The invention also extends to the dyes.

2. Description of the Prior Art

A pleochroic dye is a dye whose absorption properties vary according to the incident angle of the light relative to the molecular alignment. The absorption transition moment of a pleochroic dye having parallel dichromatic characteristics is substantially parallel to the direction of the longitudinal axis of the molecules, so that this dye absorbs little light passing along its longitudinal axis but has a maximum absorption of light passing in the direction perpendicular to its longitudinal axis.

As the pleochroic dye molecules, when placed in a liquid crystal material, adopt an orientation which follows the orientation of the liquid crystal material, one can change the direction of the orientation of the dye molecules by changing the direction of the orientation of the liquid crystal material by applying the appropriate electric field.

This phenomenon is known as the "guest-host effect" in which the pleochroic dye is regarded as "guest" and the liquid crystal material as "host".

By utilizing this phenomenon a color display device which is electrically controlled can be designed. For example, when interposed between opposed glass plates which carry transparent electrodes and whose inner surfaces have been subjected to a homogeneous orientation treatment, liquid crystal molecules having positive dielectric anistropy and including a pleochroic dye having a parallel dichromatic characteristic exhibit homogenous orientation, i.e. the longitudinal axis of the liquid crystal molecules in parallel to the glass plates, and at the same time the pleochroic dye molecules adapt as same orientation as the liquid crystal molecules. When white light passes through the liquid crystal material including a pleochroic dye in this state, a specific wavelength region of the white light is absorbed by the dye. The crystal appears colored.

If an electric field is applied to the transparent electrodes, the liquid crystal molecules turn to a homeotropic orientation in which the longitudinal axis of the molecules is perpendicular to the glass plates and the longitudinal axis of the dye molecules also turn to perpendicular to the glass plate. In this state, a white light which passes perpendicularly to the plates is little absorbed by the pleochroic dye because the electric vector of the incident light is perpendicular to the longitudinal axis of the dye. This means that the liquid crystal material is seen as transparent.

Accordingly it is possible to display information selectively utilizing the difference between the colored state and the transparent state.

The guest-host effect described above may be also obtained by utilising a nematic liquid crystal which is caused to have a special structure by addition of an optically active substance, a cholesteric liquid crystal, or a smetic liquid crystal. Color display systems utilizing these liquid crystal materials are described in detail in Japanese Laid Open Patent Applications Nos. 127645/74 and 153053/79.

In order to provide a good quality color display utilizing the guest-host effect, it is important that the pleochroic dye in the liquid crystal molecules should satisfy the following requirements.

First, it is necessary to provide maximum contrast between the colored state and the transparent state, i.e. the regularity of orientation of the pleochroic dye molecule relative to the orientation of the liquid crystal molecules should be high. This is however achieved only to a limited degree because of random thermal disturbance.

The regularity of orientation of the pleochroic dye molecules in the liquid crystal molecules is measured by a quantity known as the order parameter S which is defined by the following formula:

$$S = \tfrac{1}{2}(3\overline{\cos^2\theta} - 1)$$

wherein $\overline{\cos^2 \theta}$ is a time-averaged term and $\theta$ is the angle formed between the absorption transition moment vector of the pleochroic dye molecule and the orientation of the liquid crystal molecule.

The order parameter S is theoretically in the range $-0.5$ to 1. The closer to 1 it is, the higher is the regularity of orientation. Accordingly when a pleochroic dye having an order parameter as near one as possible is used, it is possible to obtain a good quality color display.

Second, since it is necessary to produce a clear color, the solubility of the pleochroic dye in the liquid crystal material should be sufficiently high that a desirable concentration can be easily obtained. Dye concentration is usually selected according to the thickness of the liquid crystal layer of the element and the absorptivity coefficient of the dye.

In addition to the above described requirements, it is generally required that the stability of the dye against light, heat, water and especially against oxygen should be high.

There are many known dyes, for example merocyanine type dyes, azo type dyes, azomethine type dyes, and anthraquinone type dyes, which are conventionally used as pleochroic dye for guest-host type liquid crystal display device, but only limited numbers of dyes are found to be suitable in liquid crystal applications because most of these dyes are considered to satisfy only some of the requirements explained above.

European Patent Application No. 0002104 discloses many anthraquinone dyes with anilino substituents e.g.

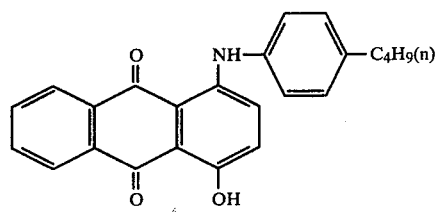

The solubilities of most of these dyes are not given. One of the dyes will be referred to again below.

SUMMARY OF THE INVENTION

It is a primary object of the present invention to provide a liquid crystal composition including a pleochroic dye which has an adequate order parameter and high solubility as well as good stability.

In accordance with the present invention a liquid crystal composition contains a pleochroic anthraquinone dye having the group —OCOO— in a substituent group.

Preferred are anthraquinone dyes represented by either of the following general formulae I and II;

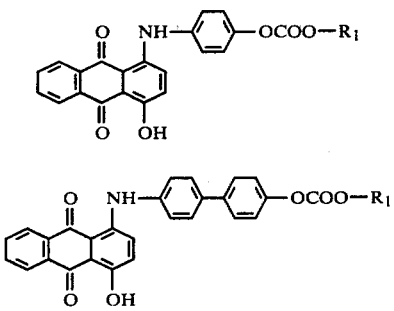

wherein $R_1$ is alkyl or cycloalkyl.

The invention further consists in these novel dyes themselves.

This invention is based on the discovery that excellent solubility of the dye in the liquid crystal material can be achieved by incorporation of the group —OCOO—.

Incorporation of a group —OCOO— in a dye is thought to give good stability because it is believed to avoid the reaction with oxygen which occurs in a dye containing an alkyl group directly coupling to benzene nucleus, i.e. the reaction

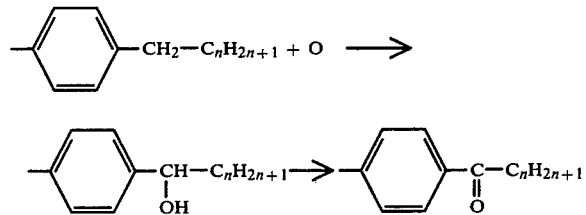

This reaction would lead to low regularity.

DETAILED DESCRIPTION OF THE INVENTION

Figure 1:
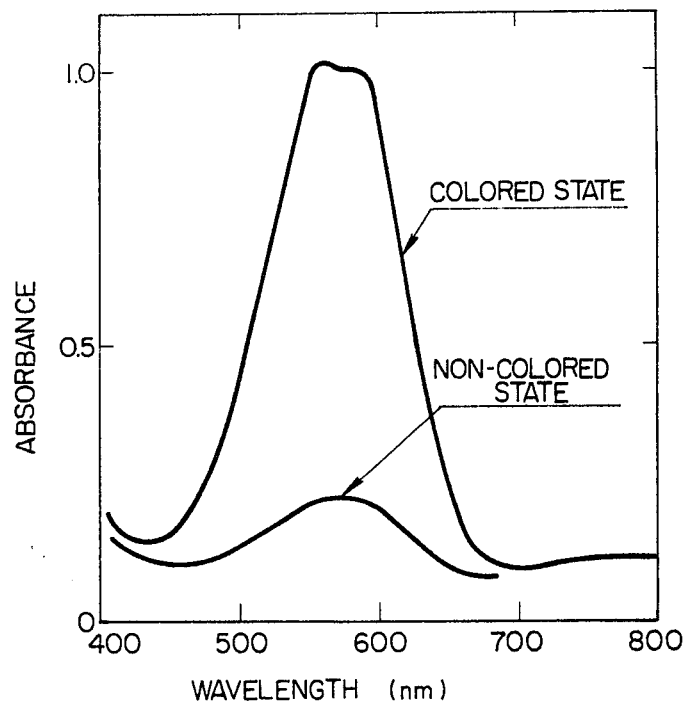
FIG. 1 is a diagram illustrating the spectral characteristics of the display element of Example 1 of the present invention, in which the abscissa indicates the wavelength and the ordinate indicates the absorbance and the absorption spectra of the colored state and the noncolored state.

The present invention will now be described in greater detail with reference to the following Examples, which give the properties of preferred liquid crystal compositions of the present invention and the methods of measurement thereof, and Table 1 which gives preferred examples of pleochroic dyes used in the present invention. Reference is also made to the accompanying drawings which show spectral characteristics of several display devices comprising liquid crystal compositions of the present invention, in which the absorption spectra of the colored state and the non-colored state are shown.

In the present invention, any suitable liquid crystal material which is in the nematic state at operational temperature can be used as the host material. Furthermore nematic liquid crystal materials converted to cholestric liquid crystals by adding optically active substances in a well known manner can be used.

Known liquid crystals of the ester, azoxy, azo, Schiff, pyridimine, diester and biphenyl ester types having a negative dielectric may be used if they are mixed with liquid crystals having a positive dielectric anisotropy so that the resulting mixtures having positive dielectric anisotropy.

These liquid crystals having a negative dielectric anisotropy can be used if an appropriate element structure and driving method are employed.

In the present invention, however, especially preferred liquid crystal materials are (1) the following liquid crystal compounds in the form of a mixture

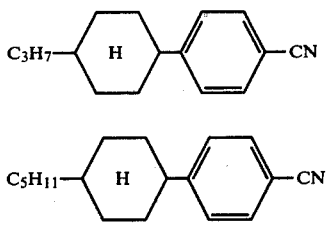

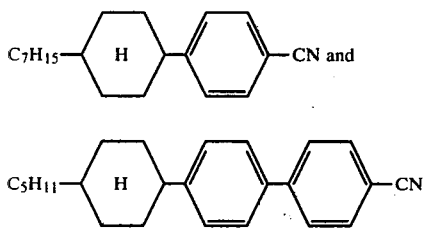

which is marketed under the tradename "ZLI-1132" by Merck Co. and (2) a mixture comprising the following liquid crystal compounds

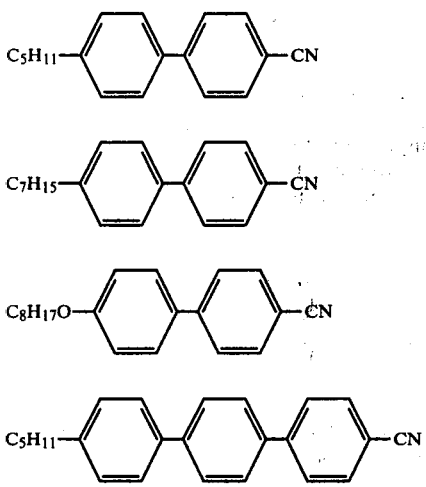

which is marketed under the tradename "E-7" by British Drug House Co.

The pleochroic anthraquinone dyes used in the present invention may be prepared by methods that will be known to one skilled in the art of chemical synthesis. A typical synthesis method is as follows:

A mixture of quinizarin, leucoquinizarin and arylamino derivatives or a mixture of quinizarin, leucoquinizarin and biphenylamino derivatives was heated so as to react in a solvent such as alcohol in the presence of a dehydrating agent such as a boric acid. After completion of the reaction the crude product was purified by means of column of alumina or silica and the pure product was recovered after several recrystallizations.

EXAMPLES

In the following examples, a well known type of liquid crystal display element is used. This comprises two glass substrates, at least one of which is transparent, transparent electrodes of an optional pattern formed on the glass substrates and an appropriate spacer which is disposed between the glass substrates so that they are parallel to each other with a gap of 10 μm. On the inner surface of each glass substrate, a polyamide type resin is coated and cured so as to be subjected to a homogeneous orientation treatment.

EXAMPLE 1

A liquid crystal composition formed by adding 1.8% by weight of pleochroic anthraquinone dye having the following chemical formula:

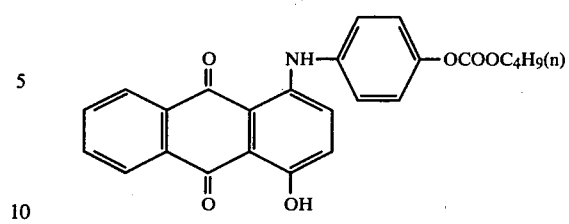

to the phenylcyclohexane type mixed liquid crystal ZLI-1132 mentioned above was heated above 70° C. and sufficiently stirred in the isotropic liquid state, and the mixture was naturally cooled. These procedures were repeated to complete the dissolution. This liquid crystal composition was sealed between the substrates of the element.

In this liquid crystal element, the absorption of the dye of light polarized parallel to the orientation direction of the liquid crystal ($A\|$) and of light polarized perpendicularly to the orientation direction of the liquid crystal ($A\perp$) was measured, and order parameter S was calculated according to the following formula:

$$S = \frac{A\| - A\perp}{2A\perp + A\|}$$

(which is used in practice to determine this parameter, though the theoretical definition is that given above). The result of the calculation was 0.62.

The absorption spectrum for light rays polarized respectively parallel and perpendicularly to the orientation direction of the liquid crystal is shown in FIG. 1. The maximum absorption wavelength of the dye in the liquid crystal material was 562 nm.

The solubility of the dye in the liquid crystal material was measured by colorimetry at room temperature. A saturated solution of the dye in the liquid crystal material was prepared and the solution obtained was filtered to remove excess undissolved dye and a known quantity of the filtrate was dissolved in chloroform to produce a standard solution. The optical density of both solutions was measured spectroscopically and the concentration of the dye at saturation was deduced from the result, the coefficient of a absorption in chloroform being known.

The solubility of the above dye was 9.5% by weight.

EXAMPLE 2

A liquid crystal composition formed by adding 17% by weight of 4-(2-methylbutyl)-4'-cyanobiphenyl supplied by British Drug House Co. as the optically active substance and 3.1% of the pleochroic anthraquinone dye used in Example 1 to the mixed liquid crystal ZLI-1132 was sealed in a liquid crystal device in the manner described in Example 1.

This liquid crystal composition took a cholesteric state having a grand jean orientation when no voltage was applied, and the element was seen as strongly colored. When an alternating current voltage of 30 V and 50 Hz was applied to the transparent electrodes of the element, the liquid crystal composition took a homeotropic orientation and the element was changed to the non-colored state.

Figure 2:
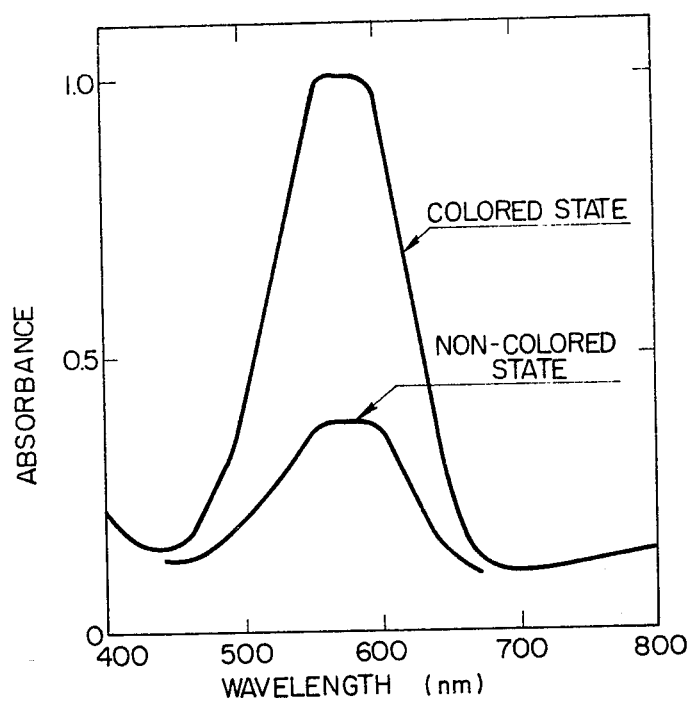
FIG. 2 is a diagram illustrating the spectral characteristics of the display element of Example 2 of the present invention, in which the abscissa indicates the wavelength and the ordinate indicates the absorbance and the absorption spectra of the colored state and the noncolored state.

The absorption spectrum of this liquid crystal composition is shown in FIG. 2.

EXAMPLE 3

A liquid crystal composition formed by adding 1.7% by weight of pleochroic anthraquinone dye having the following chemical formula

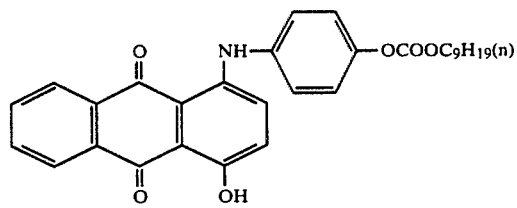

to the same liquid crystal material as used in Example 1 was sealed in an element identical to that used in Example 1.

Figure 3:
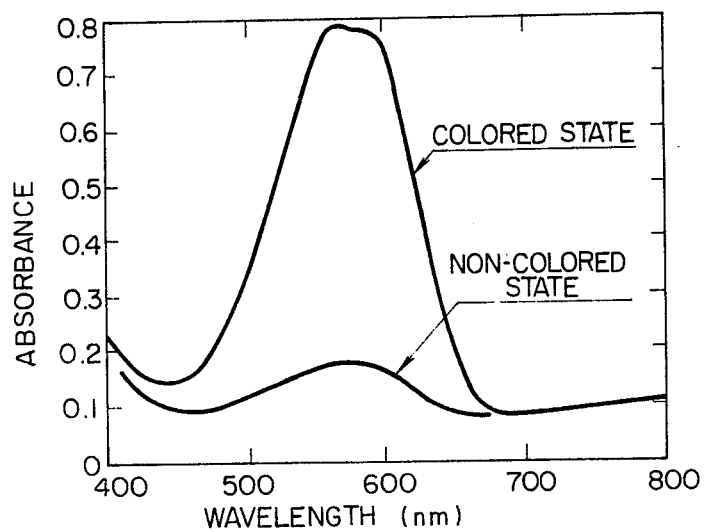
FIG. 3 is a diagram illustrating the spectral characteristics of the display element of Example 3 of the present invention, in which the abscissa indicates the wavelength and the ordinate indicates the absorbance and the absorption spectra of the colored state and the non-colored state.

The absorption spectrum determined for this liquid crystal composition is shown in FIG. 3, wherein the maximum absorption wavelength of the dye is 562 nm.

The order parameter of the dye was 0.63 and its solubility 13.5% by weight.

EXAMPLE 4

A liquid crystal composition formed by adding 1.0% by weight of a pleochroic anthraquinone dye having the following chemical formula:

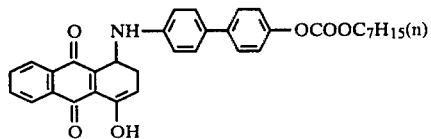

to the same liquid crystal material as used in Example 1 was sealed in an element identical to that of Example 1.

Figure 4:
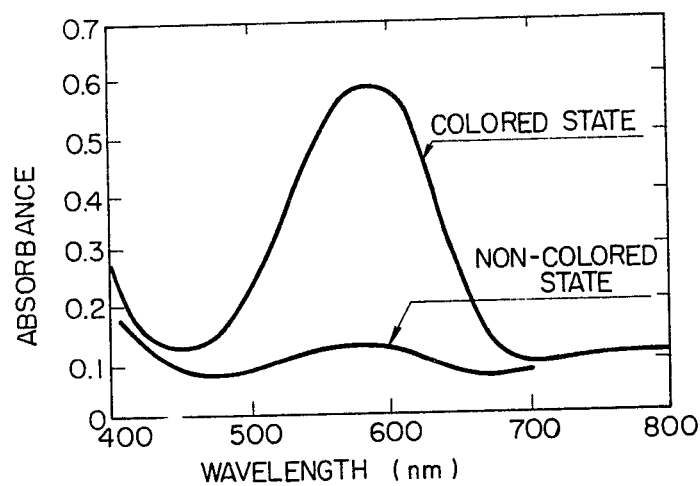
FIG. 4 is a diagram illustrating the spectral characteristics of the display element of Example 4 of the present invention, in which the abscissa indicates the wavelength and the ordinate indicates the absorbance and the absorption spectra of the colored state and the noncolored state.

The absorption spectrum determined for this liquid crystal composition is shown in FIG. 4 wherein the maximum absorption wavelength of the dye was 585 nm.

The order parameter of the dye was found to be 0.69 and its solubility to be 6.5 wt.%.

EXAMPLE 5

A liquid crystal composition formed by adding 1.3% by weight of pleochroic anthraquinone dye having the following chemical formula

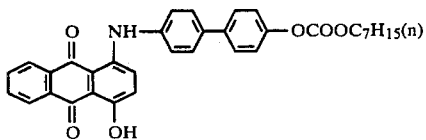

to the same liquid crystal material as used in Example 1 was sealed in an element identical to that used in Example 1.

Figure 5:
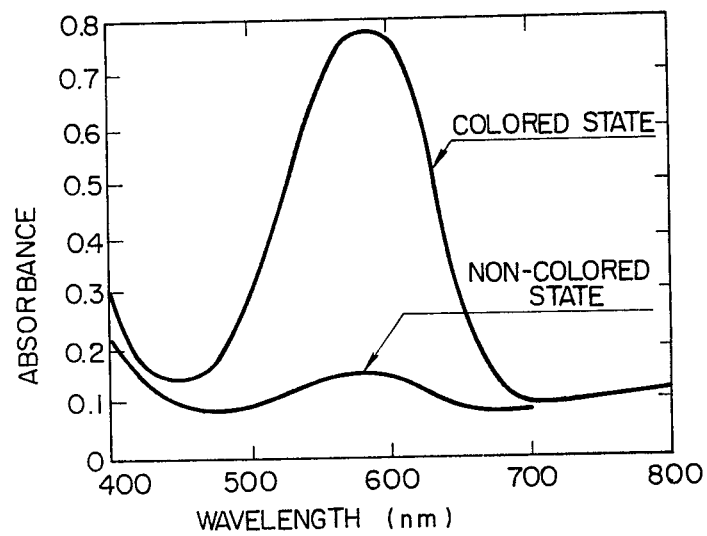
FIG. 5 is a diagram illustrating the spectral characteristics of the display element of Example 5 of the present invention, in which the abscissa indicates the wavelength and the ordinate indicates the absorbance and the absorption spectra of the colored state and the non-colored state.

The absorption spectrum determined for this liquid crystal composition is shown in FIG. 5, wherein the maximum absorption wavelength of the dye is 585 nm.

The order parameter of the dye was found to be 0.70 and its solubility to be 5.5 wt.%.

EXAMPLE 6

A liquid crystal composition formed by adding 9.4% by weight of the same optically active substance as used in Example 2 (4-(2-methylbutyl)-4'-cyanobiphenyl) and 3.2% by weight of the pleochoric anthraquinone dye having the following chemical formula to the biphenyl dye mixed crystal material E-7 was sealed in an element identical to that used in Example 2.

Figure 6:
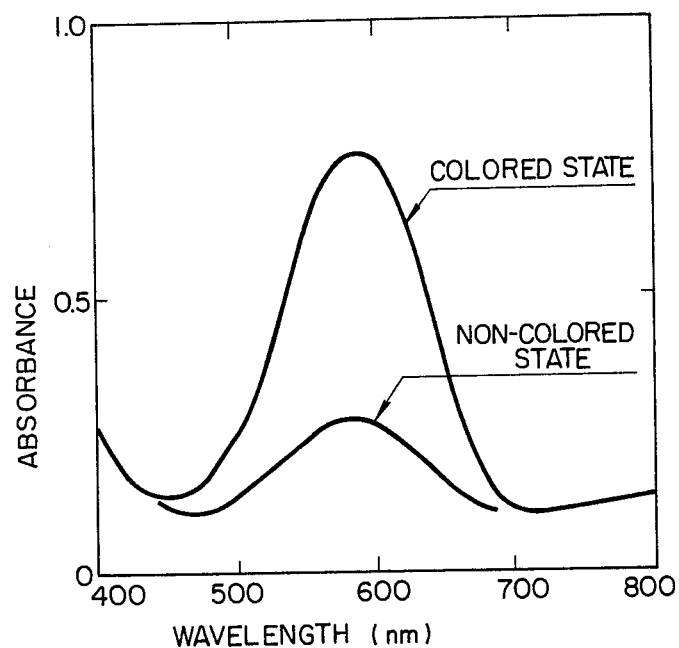
FIG. 6 is a diagram illustrating the spectral characteristics of the display element of Example 6 of the present invention, in which the abscissa indicates the wavelength and the ordinate indicates the absorbance and the absorption spectra of the colored state and the non-colored state.

The absorption spectrum of this resultant crystal is shown in FIG. 6.

Examples of pleochoric anthraquinone dyes including dyes used in the present invention and other dyes for comparison and the maximum absorption wavelength of liquid crystals containing them, their order parameters and their solubilities are shown in Table 1.

It is to be noted that in the table dyes 12 to 14 are quoted for the purposes of comparison. Dye No. 12 is disclosed in European Patent Application 0002104 mentioned above.

Comparison of dye no. 12 with dye no. 1, of dye no. 13 with dye no. 7 and of dye no. 14 with dye no. 9 shows that in each case the dye having the —OCOO— group (as required by the invention) has considerably higher solubility and a substantially unchanged order parameter.

TABLE 1

| No. | Chemical Formula | Maximum Absorption Wavelength (nm) | Order Parameter | Solubility (wt. %) |
| --- | --- | --- | --- | --- |
| 1 | | 562 | 0.62 | 9.5 |

TABLE 1-continued
| No. | Chemical Formula | Maximum Absorption Wavelength (nm) | Order Parameter | Solubility (wt. %) |
|---|---|---|---|---|
| 2 | 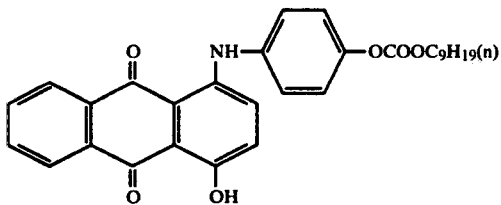 | 562 | 0.63 | 13.5 |
| 3 | 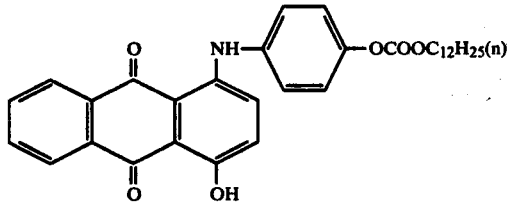 | 563 | 0.62 | 10.5 |
| 4 | 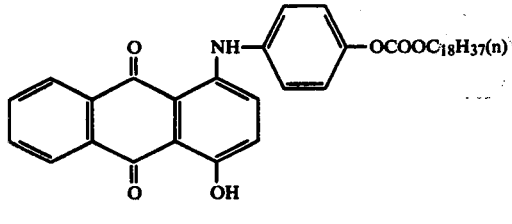 | 561 | 0.61 | 7.5 |
| 5 | 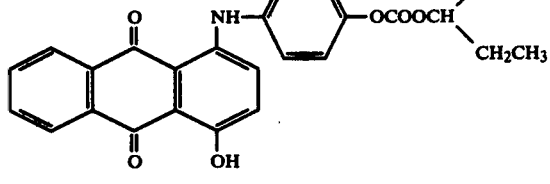 | 562 | 0.61 | 6.5 |
| 6 | 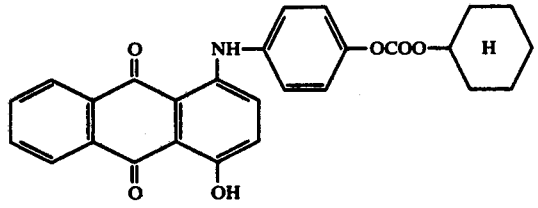 | 562 | 0.63 | 5.0 |
| 7 | 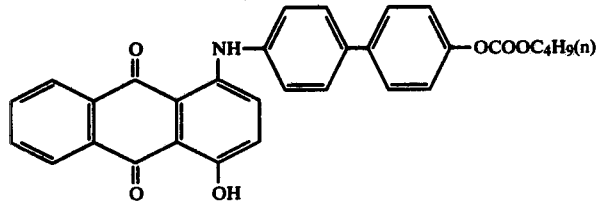 | 585 | 0.70 | 5.5 |
| 8 | 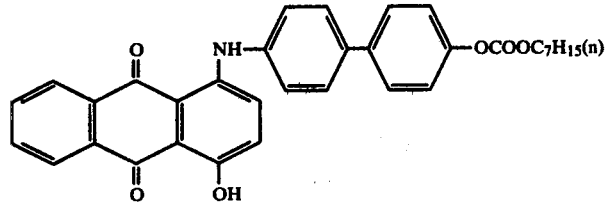 | 585 | 0.69 | 6.5 |

TABLE 1-continued
| No. | Chemical Formula | Maximum Absorption Wavelength (nm) | Order Parameter | Solubility (wt. %) |
|---|---|---|---|---|
| 9 | 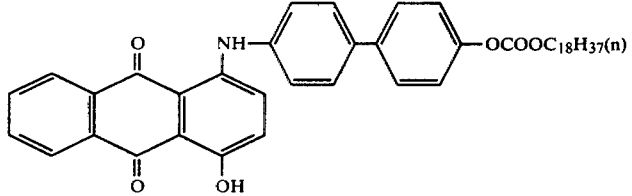 | 585 | 0.67 | 4.5 |
| 10 | 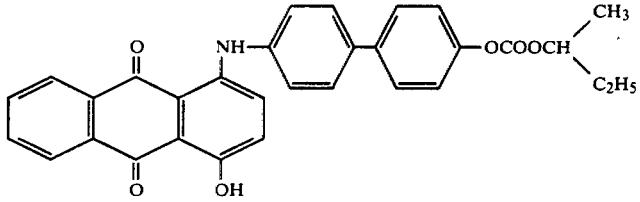 | 585 | 0.68 | 4.0 |
| 11 | 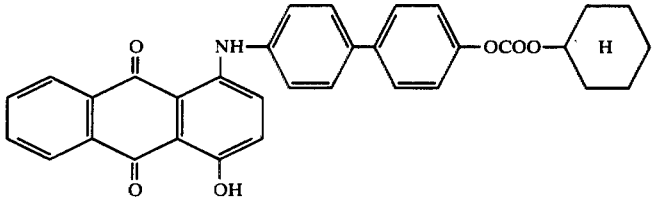 | 585 | 0.70 | 3.5 |
| 12 | 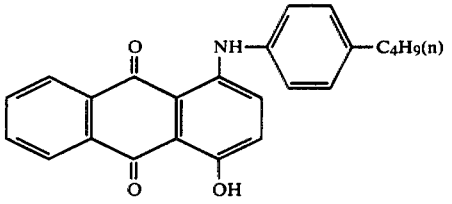 | 597 | 0.62 | 5.5 |
| 13 | 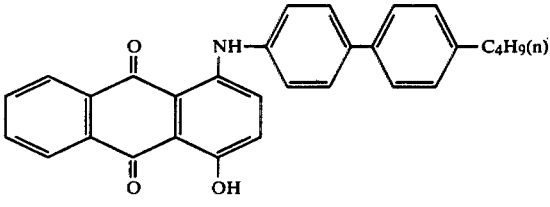 | 588 | 0.67 | 3.0 |
| 14 | 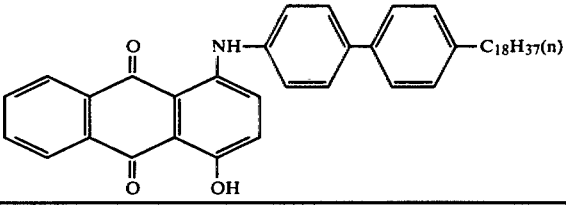 | | 0.70 | 0.5 |
We claim:
1. A liquid crystal composition containing a pleochroic anthraquinone dye, said dye having one of the two following formulae I and II:
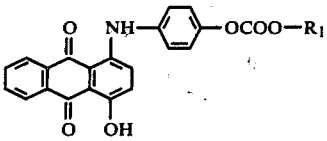 (I)

-continued

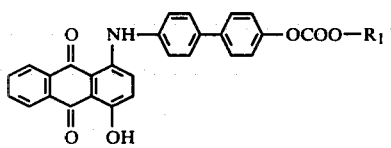
(II)

wherein $R_1$ is selected from the group consisting of alkyl and cycloalkyl.

2. A liquid crystal composition as claimed in claim 1, wherein $R_1$ is selected from the group consisting of n-$C_4H_9$, n-$C_7H_{15}$ and n-$C_9H_{19}$.

3. A liquid crystal composition as claimed in claim 1 or 2, which further includes an optically active substance.

4. A liquid crystal device comprising
 (a) a pair of spaced apart plates, at least one of which is transparent, arranged with a space between them,
 (b) a pair of layer electrodes respectively on said plates,
 (c) a liquid crystal composition located in said space between the plates, said composition comprising
   (i) a liquid crystal material having positive dielectric anisotropy forming a host material and
   (ii) a pleochroic anthraquinone dye dissolved in said liquid crystal material as a guest material, said dye having one of the two following formulae I and II

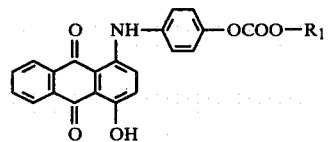
(I)

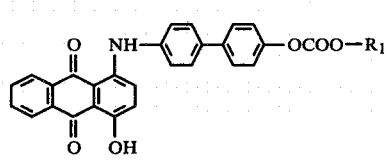
(II)

wherein $R_1$ is selected from the group consisting of alkyl and cycloalkyl.

5. A liquid crystal device as claimed in claim 4, wherein said liquid crystal material having positive dielectric anisotropy comprises a liquid crystal material having a negative dielectric and mixed with liquid crystals having a positive dielectric anisotropy so that the resulting mixture has positive dielectric anisotropy.

* * * * *